US011467780B1

(12) United States Patent
Perez Guevara et al.

(10) Patent No.: US 11,467,780 B1
(45) Date of Patent: Oct. 11, 2022

(54) SYSTEM AND METHOD FOR AUTOMATIC IDENTIFICATION AND BIOS CONFIGURATION OF DRIVES IN A BACKPLANE

(71) Applicant: Dell Products L.P., Round Rock, TX (US)

(72) Inventors: Alberto David Perez Guevara, Pflugerville, TX (US); Kurt Wade Shetler, Round Rock, TX (US); Seokwoo Lee, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/386,925

(22) Filed: Jul. 28, 2021

(51) Int. Cl.
*G06F 3/06* (2006.01)
(52) U.S. Cl.
CPC .......... *G06F 3/0689* (2013.01); *G06F 3/0604* (2013.01); *G06F 3/067* (2013.01); *G06F 3/0635* (2013.01); *G06F 3/0659* (2013.01)
(58) Field of Classification Search
CPC .... G06F 3/0689; G06F 3/0604; G06F 3/0635; G06F 3/0659; G06F 3/067
See application file for complete search history.

(56) References Cited

U.S. PATENT DOCUMENTS

| 2012/0151097 | A1* | 6/2012 | Lambert | G06F 3/0605 710/13 |
| 2020/0409558 | A1* | 12/2020 | Dance | G06F 3/0653 |
| 2021/0109885 | A1* | 4/2021 | Guo | G06F 1/04 |

\* cited by examiner

*Primary Examiner* — Nicholas J Simonetti
(74) *Attorney, Agent, or Firm* — McDermott Will & Emery

(57) ABSTRACT

A system for discovery of all devices and drives connected directly or indirectly to a backplane uses a MCU to send a communication to a controller on a platform to determine a type of upstream connection between the backplane and the platform and generate a data structure containing the information. The MCU then searches for ports on the backplane to identify devices directly connected to the backplane. The MCU searches for connectors connected to the ports to identify possible other devices and drives. The MCU searches for slot information for slots connected to the downstream connectors. The connector information, port information and slot information is stored in the data structure and the data structure is communicated to a CPLD on the platform for use by a BIOS.

18 Claims, 7 Drawing Sheets

| | BYTE | |
|---|---|---|
| HEADER | 0-9 | HEADER DESCRIPTION FORMAT |
| CONNECTOR DESCRIPTOR 0 | 10 | CONNECTOR DESCRIPTOR [0] |
| CONNECTOR DESCRIPTOR N | 33 | CONNECTOR DESCRIPTOR [N] |
| PORT DESCRIPTOR 0 | 34 | CONNECTOR DESCRIPTOR [0] |
| PORT DESCRIPTOR 6 | 47 | CONNECTOR DESCRIPTOR [0] |
| SLOT DESCRIPTOR 0 | 48 | CONNECTOR DESCRIPTOR [0] |
| SLOT DESCRIPTOR N | 111 | CONNECTOR DESCRIPTOR [0] |
| RESERVED | 112-126 | RESERVED |
| CHECKSUM | 127 | CHECKSUM |

FIG. 2

| BYTE | | | |
|---|---|---|---|
| HEADER | 0 | CMD = OOB | RESPONSE BYTE COUNT | RESERVED |

| BYTE | | | |
|---|---|---|---|
| 1 | BAY ID | FORMAT =2 |
| 2 | MAJOR REVISION | MINOR REVISION |
| 3 | BP ID = 7 | |
| 4 | RESERVED | STARTING SLOT OFFSET | BP ID |
| 5 | SECONDARY | BP LOCATION | LAST VALID CONNECTION DESCRIPTION |
| 6 | MAX PCIE SPEED: | LAST VALID SLOT DESCR |
| 7 | RESERVED | CPLD ASSIGNED IDENTIFIER | LAST VALID SWITCH PORT ID |
| 8 | RESERVED | |
| 9 | RESERVED | |

Column labels right side: 302-0, 302-1, 302-2, 302-3, 302-4, 302-5, 302-6, 302-7, 302-8, 302-9. Table reference: 300.

FIG. 3

| CONNECTOR NUMBER | BYTE | | | |
|---|---|---|---|---|
| N | 0 | REVERSAL | HOT PLUG | ATTACHED SOURCE ID |
| | 1 | BIFURCATION REQUEST | SWITCH CONNECTED | INTERFACE REQUEST |
| | 2 | RESERVED | GROUP | LANE WIDTH |

FIG. 4

| SWITCH UPSTREAM PORT ID | BYTE | | | |
|---|---|---|---|---|
| | | STARTING LANE | UPSTREAM PORT WIDTH | GROUP |
| | 1 | RESERVED | | |

FIG. 5

| SLOT DESCRIPTOR | BYTE | | | |
|---|---|---|---|---|
| N | 0 | RESERVED | | |
| | 1 | MUX VALID | DIRECT | CONNECTOR DESCRIPTOR INDEX |
| | 2 | MUX ADDRESS LOW NIBBLE | | MUX CHANNEL |
| | 3 | DISCOVERY ORDER | | GROUP | LANE OFFSET |

SYSTEM AND METHOD FOR AUTOMATIC IDENTIFICATION AND BIOS CONFIGURATION OF DRIVES IN A BACKPLANE

BACKGROUND

Field of the Disclosure

This disclosure relates generally to information handling systems and, more particularly, to systems for automatically identifying components in the information handling system and configuring the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a backplane coupled to a platform. Devices and drives may be directly connected to the backplane or connectors may enable connections between devices and the backplane.

SUMMARY

Embodiments disclosed herein may be generally directed to information handling systems and systems with for automatically identifying and configuring NVME drives in a backplane.

Embodiments disclosed herein may be directed to a method for discovery of devices as part of a boot process in an information handling system. The method may comprise a micro controller unit (MCU) on a backplane sending a sideband communication to a controller on a platform, receiving a first set of responses, each response comprising information associated with an upstream connector in a set of upstream connectors between the backplane and the controller, generating a data structure for storing the information associated with the set of upstream connectors, determining a set of ports corresponding to devices connected to the backplane, populating the data structure with port information for each port in the set of ports. The method also includes the MCU sending a sideband communication to a set of downstream connectors, each downstream connector coupled to a port on the backplane, receiving a second set of responses, each response comprising connector information associated with a downstream connector in the set of downstream connectors connected to a port in the set of ports, populating the data structure with the connector information associated with each downstream connector in the set of downstream connectors, sending a sideband communication to a set of slots, each slot connected to a downstream connector in the set of downstream connectors, populating the data structure with the slot information associated with each slot in the set of slots, and communicating the data structure from the MCU to a complex programmable logic device (CPLD) located on the platform.

In some embodiments, communication between the CPLD and the MCU comprises a one-wire communication. In some embodiments, the controller comprises a root port complex. In some embodiments, the controller comprises a redundant array of independent disks (RAID) controller.

In some embodiments, the connector information comprises one or more of a bifurcation request, an attached source identifier, hot plug information, an interface request, a group associated with the connector and a lane width. In some embodiments, the slot information comprises one or more of a connector descriptor index, a lane offset, a discovery order and a group associated with the slot. In some embodiments, the backplane comprises a switch with an upstream port corresponding to a group. In some embodiments, a connector between the backplane and the platform comprises a cable connector.

BRIEF DESCRIPTION OF THE DRAWINGS

For a more complete understanding of the invention and its features and advantages, reference is now made to the following description, taken in conjunction with the accompanying drawings, in which:

FIG. 2 is a data structure comprising information determined from discovery of the information handling system of FIGS. 1A and 1B;

FIG. 3 is a data structure of a header for the data structure of FIG. 2;

FIG. 4 is a data structure of a connector for the data structure of FIG. 2;

FIG. 5 is a data structure of a port for the data structure of FIG. 2;

FIG. 6 is a data structure of a slot for the data structure of FIG. 2; and

DESCRIPTION OF PARTICULAR EMBODIMENT(S)

Figure 1A:
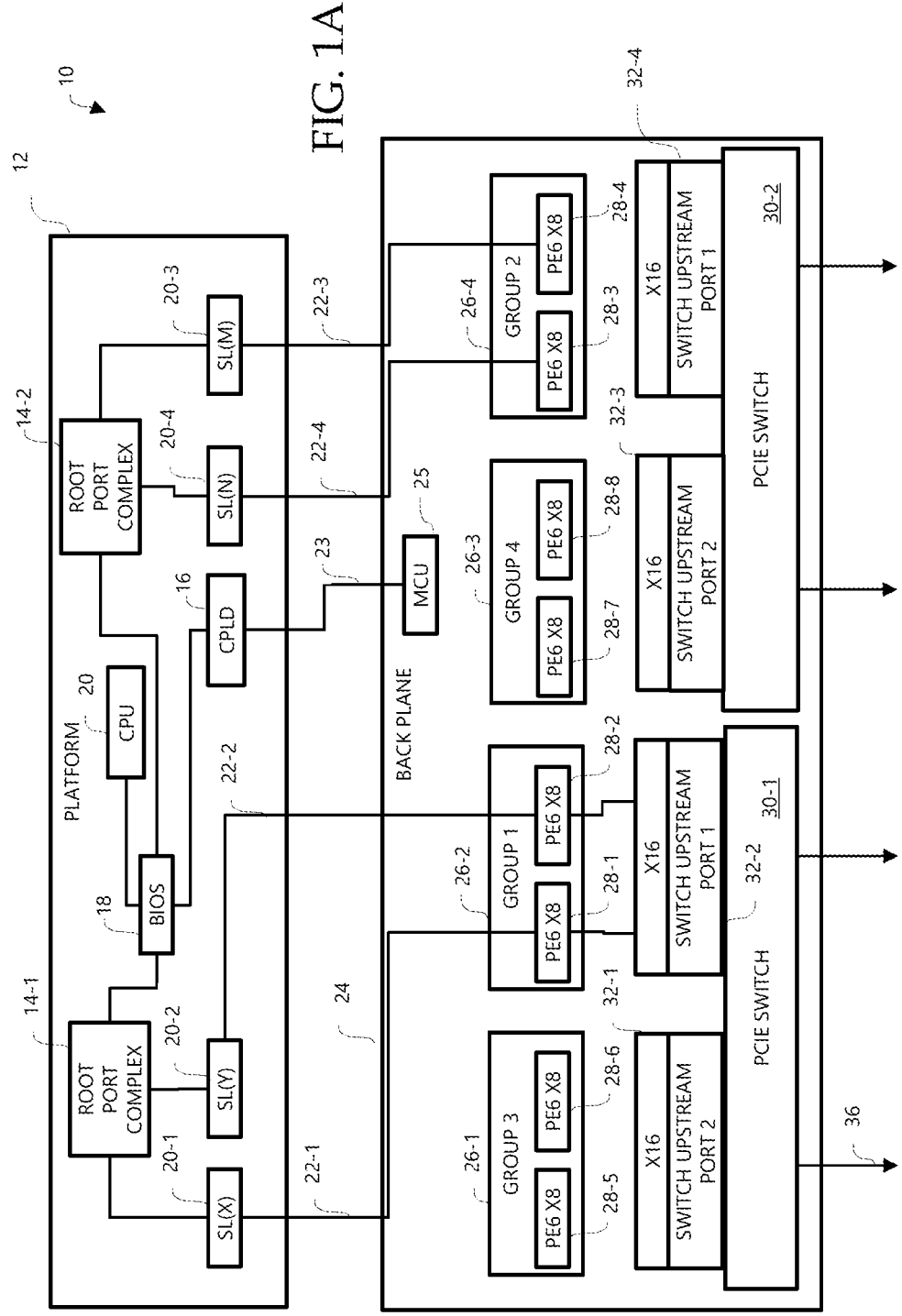
FIGS. 1A and 1B depict portions of a schematic diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, port "34" refers to a port, which may be referred to collectively as ports "34" and any one of which may be referred to generically as port "34."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

In an information handling system, a processor subsystem may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 12 may interpret and execute program instructions and process data stored locally (e.g., in memory subsystem 16). In the same or alternative embodiments, processor subsystem 12 may interpret and execute program instructions and process data stored remotely (e.g., in a network storage resource).

Components of a processor subsystem may communicate with other components via a system bus. A system bus may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, Non-Volatile Memory Express (NVMe), Serial AT Attachment (SATA), Compute Express Link (CXL) and Video Electronics Standards Association (VESA) local bus.

Components of a memory subsystem may comprise a system, device, or apparatus operable to retain and retrieve program instructions and data for a period of time (e.g., computer-readable media). Components of a memory subsystem may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system is powered down.

Components of an I/O subsystem may comprise a system, device, or apparatus generally operable to receive and transmit data to or from or within an information handling system. Components of an I/O subsystem may represent, for example, a variety of communication interfaces, graphics interfaces, video interfaces, user input interfaces, and peripheral interfaces. In various embodiments, components of an I/O subsystem may be used to support various peripheral devices, such as a touch panel, a display adapter, a keyboard, a touch pad, or a camera, among other examples. In some implementations, components of an I/O subsystem may support so-called 'plug and play' connectivity to external devices, in which the external devices may be added or removed while information handling system 100 is operating.

Components of a local storage resource may comprise computer-readable media (e.g., hard disk drive, floppy disk drive, CD-ROM, and other type of rotating storage media, flash memory, EEPROM, or another type of solid-state storage media) and may be generally operable to store instructions and data.

Components of a network interface may be a suitable system, apparatus, or device operable to serve as an interface between information handling system 10 and a network (not shown). Components of a network interface may enable information handling system 100 to communicate over a network using a suitable transmission protocol or standard. In some embodiments, components of a network interface may be communicatively coupled via a network to a network storage resource (not shown). A network coupled to components of a network interface may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to components of a network interface may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to components of a network interface or various components associated therewith may be implemented using hardware, software, or any combination thereof.

Figure 1B:
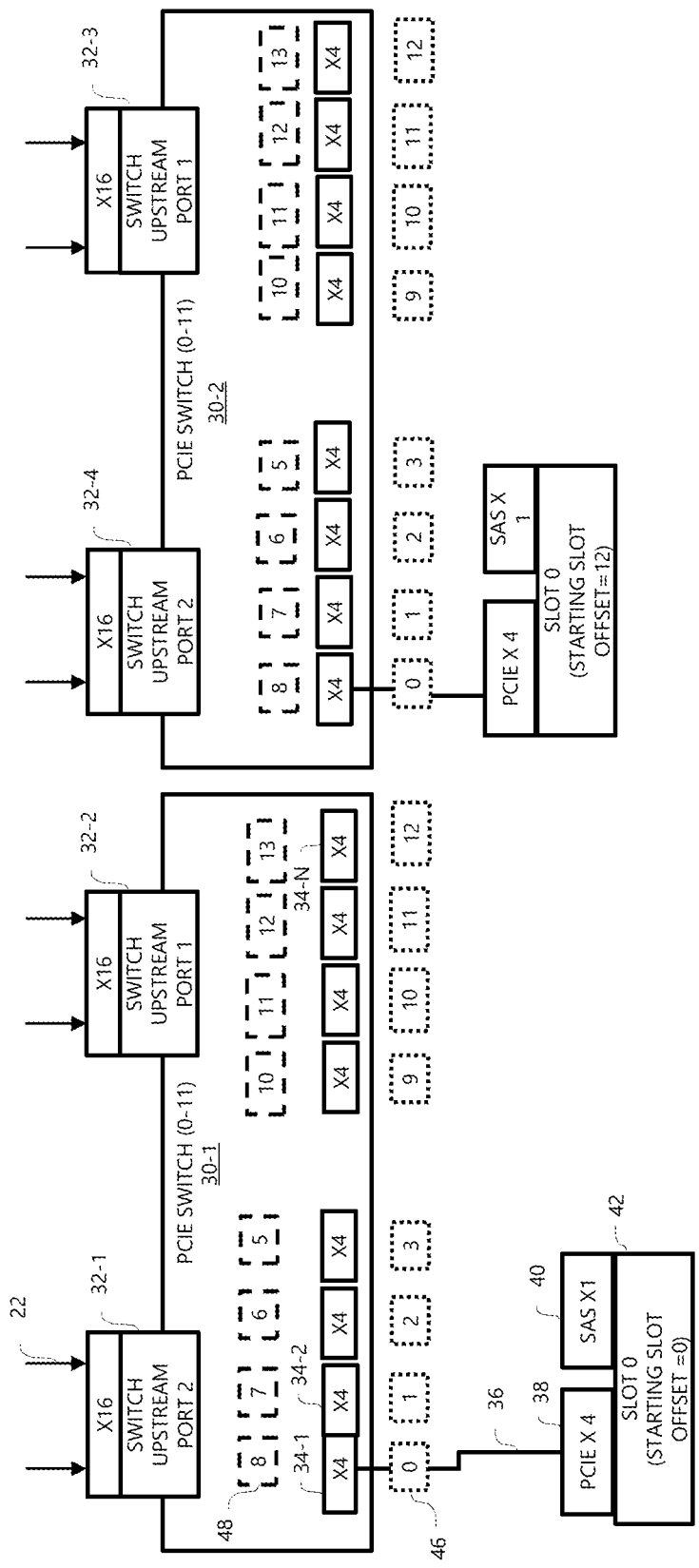

Turning to the FIGURES, FIGS. 1A-1B depict a generic topology of an information handling system 10. Information handling system 10 may comprise platform 12 having one or more controllers 14, complex programmable logic device (CPLD) 16, BIOS 18 and slots 20.

Platform 12 may comprise a printed circuit board (PCB) with a CPU forming part of a processor subsystem, CPLD 22 including memory, Basic Input Output System (BIOS) 18 and a remote access controller (not shown).

In some embodiments, controller 14 may be a root port complex for connecting a CPU or other processor on platform 12 with memory subsystem using as part of a PCIe system. In other embodiments (discussed below), controller 14 may be a redundant array of independent devices (RAID) controller. A root port complex 14 may be a stand-alone component or form part of a processor such as a CPU.

BIOS 18 may be configured to initialize the chipset, train I/O devices and create the tables describing all I/O devices that will be referenced by BIOS drivers.

Connection between platform 12 and backplane 24 may be possible using cables 22. Cables 22 may comprise multiple channels. For example, each cable 22 between connectors 20 and Group 1 may comprise 4 channels. In some embodiments, cable 22 comprise modular connectors. In some embodiments, connectors 20 comprise slimline (SL) connectors.

In PCIe systems, cables 22 connect each root port complex 14 to switch 30 on backplane 24. Upstream ports 28 may comprise a plurality of lanes in groups 26. As depicted in FIG. 1A, each group 26 may comprise 16 lanes (×16). Referring to Group 1, a first set 28-1 of lanes (e.g. 8 lanes or ×8) may be dedicated to cable 22-1 and a second set 28-2 of lanes (e.g. 8 lanes or ×8) may be dedicated to cable 22-2.

PCIe switch 30 comprises a plurality of slots 34 for connecting to I/O devices. For example, PCIe switch 30-1 may have twelve slots 34, with each slot 34 comprising 4 lanes (×4). A device directly coupled to slot 34 may be discovered by an MCU 25 in backplane 24.

Devices May be Indirectly Connected to a Root Port Complex

In addition to each switch 30 having devices directly connected to one or more ports 34, each switch 30 depicted in FIG. 1A may be connected (as depicted by arrows 36 in FIG. 1A) downstream to devices in slots 42 (as depicted in FIG. 1B). Common approaches to discovering devices in information handling system 100 are unable to map these devices. This is problematic because information handling system 10 may have multiple devices connected to PCIe switch 30, wherein all of the devices may look identical to a user looking at the front of information handling system 10. A device may be directly connected or may be connected with a connector.

Each device at a slot 42 is assigned a device number and a bus device function number (BDF) identifier such that other components can communicate with the device. So, if a program executing on CPU 20 wants to talk to an endpoint such as a storage device or printer in slot 42 but connected by a connector 36 to switch 30, the program uses the BDF associated with slot 42-N and creates a handle to communicate with the endpoint.

Static Tables Require Updating

Using some approaches, static tables stored in CPLD memory contain all the information describing each device directly or indirectly connected to controller 14 or information about a printed circuit board (PCB) supporting each device directly or indirectly connected to controller 14. A non-volatile memory (NVM) drive may be physically located at a first slot 42 (referring to the number "0" in device connector index 46) relative to PCIe switch 30-1 but information stored in CPLD 16 may associate the NVM drive with a virtual slot 8 (referring to the number "8" in box 48). Thus, a user manually entering information about a NVM drive connected via at each slot 42 to PCIe switch 30-1 would need to know to store information for the NVM to the correct virtual slot in CPLD memory. Furthermore, if a connector for a first device installed in a first slot 42 is moved to another port 34, another switch 30, or another controller 14 by moving its cable 36, the bus device function identifier can change, and the tables need to be updated.

Enumeration Eliminates Need for Static Tables

Enumeration may refer to a process for the host operating system (OS) to identify each device and learn about the device. Some enumeration approaches for identifying devices rely on the devices being directly connected to CPU root complex ports. Using these approaches, software executing on a controller communicates with directly connected devices to learn properties about the devices. The devices transfer their self-describing payload to CPLD 16 and CPLD 16 stores the information in memory accessible by BIOS 18 and a remote access controller (such as Integrated Dell Remote Access Controller or iDRAC) to consume. In some information handling systems, BIOS 18 performs a depth-first traversal in which a request is sent to potential devices. When BIOS 18 receives a response that indicates the potential device is a switch, BIOS 18 sends a request to the switch to get information for all potential devices connected to the switch.

By consuming the information stored in the CPLD memory, BIOS 18 can detect and support directly connected devices without foreknowledge of a device's existence. In other words: BIOS 18 does not need static tables describing I/O devices or the printed circuit boards (PCB)s that house them (risers, backplanes 24, RAID controllers, etc.). However, enumeration is only possible in information handling systems executing software capable of communicating with directly connected devices.

Enumeration of Directly Connected Devices and Indirectly Connected Devices

As information handling systems increase in complexity, embodiments described herein allow information handling systems to perform self-discovery of devices directly connected to a CPU root port complex as well as I/O devices coupled to a backplane connected to a CPU root port complex.

Using these approaches, software executing on a microcontroller unit (MCU can communicate with directly connected devices to learn properties about the devices and any Input/Output devices coupled to the devices.

Enumeration may follow a depth-first traversal of the information handling system, whereby information is collected from a first device directly connected to a root port complex 14 and all devices coupled to the first device before information is collected from a second device coupled to root port complex 14.

In some embodiments, a 1-wire Universal Asynchronous Receiver-Transmitter (UART) payload provides an expected discovery order for every hot-pluggable downstream device-facing port. This information, along with the cable and switch port descriptors, is enough to explicitly discover an end-to-end mapping from each root port complex 14 to any drive directly or indirectly connected to root port complex 14.

By consuming the information stored in the CPLD memory, BIOS 18 can detect and support PCIe, SAS, and SATA devices without foreknowledge of a device's existence. In other words: BIOS 18 does not need static tables describing I/O devices or the printed circuit boards (PCB)s that house them (risers, backplanes 24, RAID controllers, etc.).

Backplane 24 may identify the topology and configure itself appropriately at power-on or reset. In some embodiments, backplane 24 comprises a microcontroller unit (MCU) 25 configured to identify devices and identify cables connected to backplane 204. In some embodiments, backplane 24 uses one-wire sideband communication to identify downstream cables 36 and devices in slots 42 connected by downstream cables 36. MCU 25 may communicate information to root port complex 14 via sideband connector 23 and root port complex 14 may communicate the information to CPLD 16.

MCU 25 comprises firmware that, upon information handling system 10 booting, searches for a backplane identifier for backplane 24. Using the backplane identifier, MCU 25 may determine a type of backplane 24. For example, MCU 25 may determine backplane 24 is a 24 switch backplane. MCU 25 may create and populate a data structure based on the physical routing of backplane 204.

Generation of Data Structure

FIG. 2 depicts one embodiment of a data structure 200 containing fields for various descriptors. Header 202 may comprise bytes 0-9 storing header information. Connector descriptors 204-0 to 204-N may contain bytes 10-33 storing connector information for upstream connectors 22 and downstream connectors 36. Port descriptors 206-0 to 206-N may contain bytes 34-47 storing port information for ports 34. Slot descriptors 208-0 to 208-N may contain bytes 48-111 storing slot information for slots 42.

FIG. 3 depicts one embodiment of a data structure 300 containing fields for a header 202. Notably, field 302-1 may contain information such as a bay identifier, field 302-4 may contain information such as a starting slot offset and a backplane identifier, field 302-5 may contain information such as a last valid connector descriptor, field 302-6 may contain information such as a maximum PCIe speed and last valid slot descriptor, and field 302-7 may contain information such as a CPLD assigned identifier and a last valid switch port.

FIG. 4 depicts one embodiment of a data structure 400 containing fields for a connector descriptor 204. Notably, field 402-0 may contain information such as whether the connector allows hot plugging and an attached source identifier, field 202-1 may contain information such as whether there is a bifurcation request, whether a switch is connected and whether there is an interface request, and field 402-3 may contain information such as a group identifier and a lane width.

FIG. 5 depicts one embodiment of a data structure 500 containing fields for an upstream port. Notably, field 502-0 may contain information such as a starting lane, an upstream port width and a group.

FIG. 6 depicts one embodiment of a data structure 600 containing fields for slot 42. A lost descriptor data structure 600 stores information about the slot 42 and what connector 36. A connector descriptor index may be used to help identify a physical slot associated with slot 42. Notably, field 602-1 may contain information such as a connector descriptor index and a lane offset and field 602-3 may contain information such as a discovery order and a group. Using the connector descriptor data structure 600, To generate data structure 200, MCU 25 queries devices on backplane 24. MCU 25 may start by determining what cables 22 are attached. Once MCU 25 has determined what type of cables 22 are connected, MCU 25 stores the information about the cables 22 into connector descriptor data structure 400 in data structure 200. For example, when backplane 24 boots, MCU 25 may determine that group 32-4 corresponds with Group 2, and that group 32-4 is connected to cable 22-3, which is connected to connector 20-3 corresponding to SL(M). MCU 25 may have a voltage divider to determine a type of connector. MCU 25 may determine that, based on a voltage divider measuring 3.2 volts on connector 22-3, Group 2 is connected to SL(M) and may add that information into connector descriptor structure 400 in data structure 200. Connector information may indicate SL(M) is bifurcated as by two, by four, by eight, or by sixteen. Connector information in data structure 200 may include interface request information that a connector corresponds to a PCIe drive or a SAS access slot only. Data structure 200 includes information need by BIOS 18 to communicate with devices directly and indirectly connected to platform 12 and backplane 24. In some embodiments, MCU 25 collects information, stores the information in data structure 200 and communicates data structure 200 across one wire bus 23 to CPLD 16.

In some embodiments, switch 30 may use a two-wire serial bus to discover which cables 22 are attached. In some embodiments, switches 30 may comprise PCIe switches that support hot-plugging of downstream devices, discussed in more detail below.

Embodiments may use data structure 200 to store information about other configurations of information handling system 10.

Figure 7:
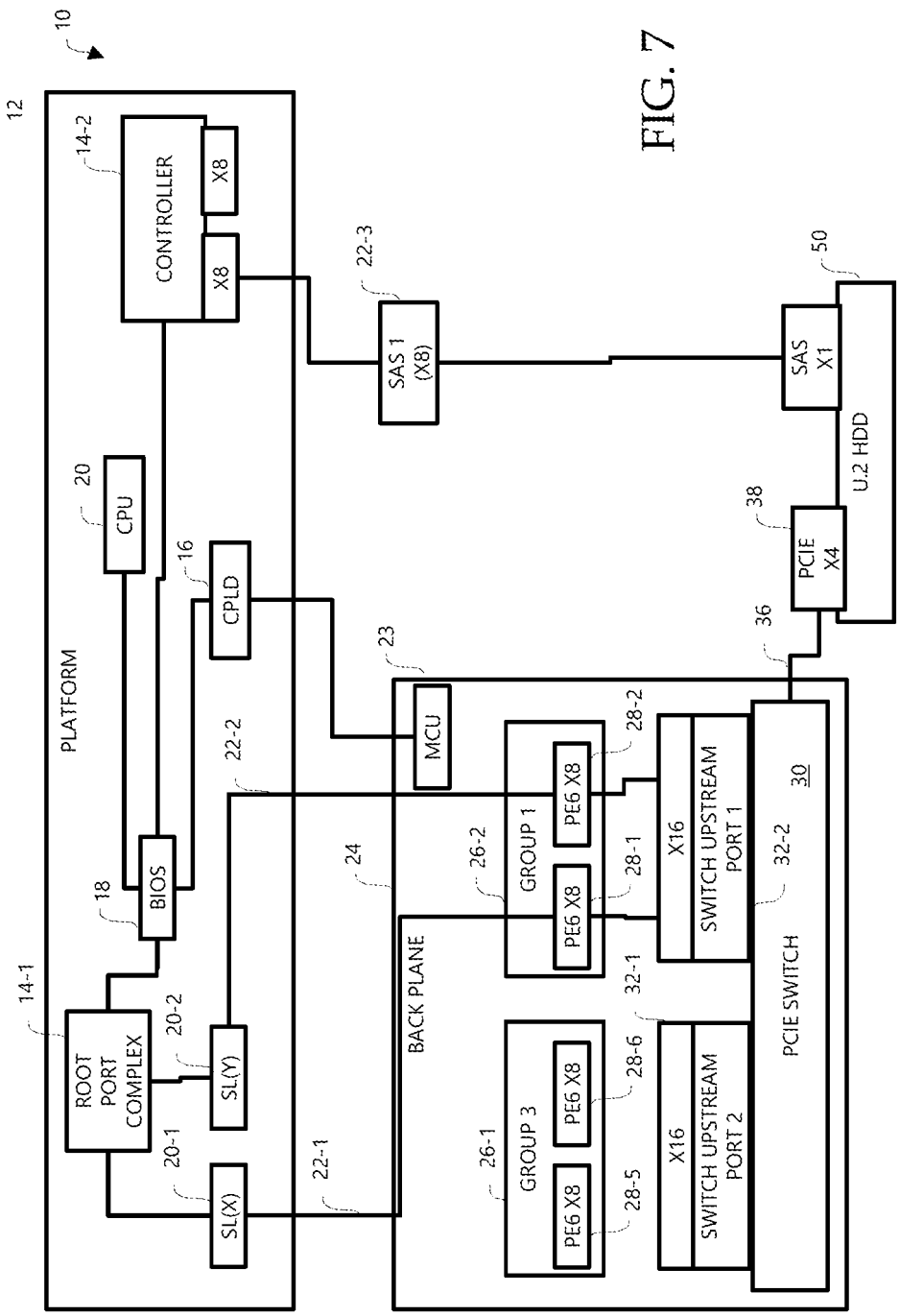
FIG. 7 is a schematic diagram of selected elements of an embodiment of an information handling system.

FIG. 7 depicts a topology of information handling system 10 that comprises platform 12 with first controller 14-1 comprising a root port complex and second controller 14-2, which may be a RAID controller. First controller 14-1 may be connected to two upstream connectors 20-1 and 20-2, such that cables 22 connect first controller 14-1 to switch 30 on backplane 24. Each group of upstream connectors forms a 16 channel connection between PCIe switch 30 on backplane 24. Each upstream connector 20-1 and 20-2 may form part of a communication path that allows programs executing on controller 14-1 to communicate with devices directly connected to switch 30 or connected to switch 30 using connectors 36 including non-volatile memory (NVM) devices, SAS devices or Universal devices.

Still referring to FIG. 7, hard disc drive (HDD) 50 may comprise a microcontroller unit (MCU). As depicted in FIG. 7, HDD 50 may be directly connected to controller 14-2 by SAS cable 22-3. HDD 50 may also be capable of communicating with components of a PCIe system using PCIe connector 38 connected to PCIe switch 30.

Some slots 42 support or enable hot plugging of devices. Other slots 42 may not support hot plugging.

A drive may not support PCIe connection. For example, some drives may support only SAS connections. Information may be relayed to the controller 14-2.

Thus, starting from a cold boot sequence, a complex programmable logic device (CPLD) performs 1-wire operations and logs an inventory of devices for access by a BIOS.

Early in a boot process, once a CPU reset has been de-asserted and a security phase has been cleared, a BIOS CPLD driver consumes CPLD information and produces device descriptions through a Dynamic Device Description PEI driver.

After this, a modularity core processor will analyze all corresponding pieces of information found during the boot process (e.g., platform, chipset and external devices) and produce a modularity core output hand-off block.

A chipset initialization device driver will consume this information in order to properly initialize all chipset-related interphases and corresponding modes of operation. It will also produce information structures that will be shared with other drivers in BIOS 18.

NVMe BIOS drivers may identify which devices are part of switch 30.

Starting from the parent root bridge a deep search is performed, in which every device that is the last upstream port to a given endpoint will have a support indication. This upstream port is capable to handle an NVMe or SAS device. In incremental order these devices will consume the backplane Bay identifier (ID) and Slot numbers reported by the supported payloads.

From this point on, every other BIOS module supports the PCIe switch backplane 24 as any other device.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for discovery of devices in response to a boot process in an information handling system, the method comprising:
   sending, by a micro controller unit (MCU) on a backplane, a first sideband communication to a controller on a platform;
   receiving a first set of responses, each response comprising information associated with an upstream connector in a set of upstream connectors between the backplane and the controller;
   generating a data structure for storing the information associated with the set of upstream connectors;
   determining, by the MCU, a set of ports corresponding to devices connected to the backplane;
   populating the data structure with port information for each port in the set of ports;
   sending a second sideband communication to a set of downstream connectors, each downstream connector coupled to a port in the set of ports;
   receiving a second set of responses, each response comprising connector information associated with a downstream connector in the set of downstream connectors connected to a port in the set of ports;
   populating the data structure with the connector information associated with each downstream connector in the set of downstream connectors;
   sending a third sideband communication to a set of slots, each slot connected to a downstream connector in the set of downstream connectors;
   populating the data structure with the slot information associated with each slot in the set of slots; and
   communicating the data structure from the MCU to a complex programmable logic device (CPLD) located on the platform.

2. The method of claim 1, wherein communication between the CPLD and the MCU comprises a one-wire communication.

3. The method of claim 1, wherein the controller comprises a root port complex.

4. The method of claim 1, wherein the controller comprises a redundant array of independent disks (RAID) controller.

5. The method of claim 1, wherein the connector information comprises one or more of a bifurcation request, an attached source identifier, hot plug information, an interface request, a group associated with the connector and a lane width.

6. The method of claim 1, wherein the slot information comprises one or more of a connector descriptor index, a lane offset, a discovery order and a group associated with the slot.

7. The method of claim 1, wherein the backplane comprises a switch with an upstream port corresponding to a group.

8. The method of claim 1, wherein a connector between the backplane and the platform comprises a cable connector.

9. A system for supporting discovery of devices connected in an information handling system, the system comprising:
   a complex programmable logic device (CPLD) on a platform; and
   a micro controller unit (MCU) on a backplane, the MCU configured to:
   send a first sideband communication to a controller on the platform;
   receive a first set of responses, each response comprising information associated with an upstream connector in a set of upstream connectors between the backplane and the controller;
   generate a data structure for storing the information associated with the set of upstream connectors;
   determine a set of ports corresponding to devices connected to the backplane;
   populate the data structure with port information for each port in the set of ports;
   send a second sideband communication to a set of downstream connectors, each downstream connector coupled to a port in the set of ports;
   receive a second set of responses, each response comprising connector information associated with a downstream connector in the set of downstream connectors connected to a port in the set of ports;
   populate the data structure with the connector information associated with each downstream connector in the set of downstream connectors;
   send a third sideband communication to a set of slots, each slot connected to a downstream connector in the set of downstream connectors;
   populate the data structure with the slot information associated with each slot in the set of slots; and
   communicate the data structure from the MCU to the CPLD.

10. The system of claim 9, wherein the controller comprises a root port complex.

11. The system of claim 9, wherein the controller comprises a redundant array of independent disks (RAID) controller.

12. The system of claim 9, wherein the connector information comprises one or more of a bifurcation request, an attached source identifier, hot plug information, an interface request, a group associated with the connector and a lane width.

13. The system of claim 9, wherein the slot information comprises one or more of a connector descriptor index, a lane offset, a discovery order and a group associated with the slot.

14. An information handling system, comprising:
   a platform comprising a root port complex and a complex programmable logic device (CPLD); and
   a backplane connected to the platform by a set of upstream connectors, the backplane comprising:
   a switch having a plurality of ports, wherein a set of devices are connected to one or more ports;
   a set of downstream connectors coupled to one or more ports of the plurality of ports, wherein one or more devices are connected by the set of downstream connectors to the one or more ports; and
   a microcontroller unit (MCU) configured to:
   send a first sideband communication to a controller on the platform;
   receive a first set of responses, each response comprising information associated with an upstream connector of the set of upstream connectors;
   generate a data structure for storing the information associated with the set of upstream connectors;
   determine the one or more ports corresponding to the devices connected to the backplane;

populate the data structure with port information for each port in the one or more ports;

send a second sideband communication to the set of downstream connectors;

receive a second set of responses, each response comprising connector information associated with a downstream connector in the set of downstream connectors;

populate the data structure with the connector information associated with each downstream connector in the set of downstream connectors;

send a third sideband communication to a set of slots, each slot connected to a downstream connector in the set of downstream connectors;

populate the data structure with the slot information associated with each slot in the set of slots; and communicate the data structure from the MCU to the CPLD.

15. The information handling system of claim 14, wherein the controller comprises a root port complex.

16. The information handling system of claim 14, wherein the controller comprises a redundant array of independent disks (RAID) controller.

17. The information handling system of claim 14, wherein the connector information comprises one or more of a bifurcation request, an attached source identifier, hot plug information, an interface request, a group associated with the connector and a lane width.

18. The information handling system of claim 14, wherein the slot information comprises one or more of a connector descriptor index, a lane offset, a discovery order and a group associated with the slot.

* * * * *